United States Patent
Tanabe et al.

(10) Patent No.: US 12,459,336 B2
(45) Date of Patent: Nov. 4, 2025

(54) VEHICLE AIR CONDITIONING SYSTEM AND VEHICLE AIR CONDITIONING METHOD

(71) Applicant: MITSUBISHI HEAVY INDUSTRIES THERMAL SYSTEMS, LTD., Tokyo (JP)

(72) Inventors: Hirotaka Tanabe, Tokyo (JP); Takayuki Kobayashi, Tokyo (JP); Yasutaka Aoki, Tokyo (JP); Tomoki Hase, Tokyo (JP); Hideaki Tatenoi, Tokyo (JP)

(73) Assignees: MITSUBISHI HEAVY INDUSTRIES THERMAL SYSTEMS, LTD., Tokyo (JP); SYSTEMS, LTD., Tokyo (JP)

( * ) Notice: Subject to any disclaimer, the term of this patent is extended or adjusted under 35 U.S.C. 154(b) by 209 days.

(21) Appl. No.: 18/034,772

(22) PCT Filed: Nov. 10, 2021

(86) PCT No.: PCT/JP2021/041339
§ 371 (c)(1),
(2) Date: May 1, 2023

(87) PCT Pub. No.: WO2022/102658
PCT Pub. Date: May 19, 2022

(65) Prior Publication Data
US 2023/0415547 A1  Dec. 28, 2023

(30) Foreign Application Priority Data
Nov. 16, 2020 (JP) .................................. 2020-190179

(51) Int. Cl.
*B60H 1/32* (2006.01)

(52) U.S. Cl.
CPC ....... *B60H 1/32281* (2019.05); *B60H 1/3205* (2013.01)

(58) Field of Classification Search
CPC .............. B60H 1/32281; B60H 1/3205; B60H 1/00885; B60H 1/3207; B60H 2001/00961; B60H 1/00899; B60H 1/32284
See application file for complete search history.

(56) References Cited

U.S. PATENT DOCUMENTS

2004/0035130 A1  2/2004  Amaral et al.
2018/0208014 A1  7/2018  Ben Ahmed et al.
(Continued)

FOREIGN PATENT DOCUMENTS

DE  102014111971 A1 *  2/2016  ......... B60H 1/32284
DE  102019107191 A1  9/2020
(Continued)

OTHER PUBLICATIONS

DE 102014111971 A1 Translation (Year: 2014).*
(Continued)

Primary Examiner — Jerry-Daryl Fletcher
Assistant Examiner — Dario Antonio Deleon
(74) Attorney, Agent, or Firm — Osha Bergman Watanabe & Burton LLP

(57) ABSTRACT

A vehicle air conditioning system includes a refrigerant circuit that circulates a refrigerant through a compressor, a heat-absorbing heat exchanger, a decompression unit, and a heat-dissipating heat exchanger, a heat medium circuit including a high-temperature heat medium circuit that circulates a high-temperature heat medium and a low-temperature heat medium circuit that circulates a low-temperature heat medium, a vehicle interior heat exchanger that exchanges heat between air and at least one of the high- (Continued)

temperature heat medium and the low-temperature heat medium, a vehicle exterior heat exchanger that exchanges heat between air and at least one of the high-temperature heat medium and the low-temperature heat medium, and a switching unit that switches respective flows of the high-temperature heat medium and the low-temperature heat medium in accordance with an operation mode of the vehicle air conditioning system.

8 Claims, 10 Drawing Sheets

(56) References Cited

U.S. PATENT DOCUMENTS

| | | | |
|---|---|---|---|
| 2018/0251011 A1* | 9/2018 | Sugimura et al. | B60H 1/00899 |
| 2018/0281562 A1 | 10/2018 | Spies et al. | |
| 2020/0298663 A1 | 9/2020 | Allgaeuer et al. | |
| 2021/0268870 A1* | 9/2021 | Jia et al. | F25B 41/325 |
| 2022/0097478 A1* | 3/2022 | Dong | B60H 1/32284 |

FOREIGN PATENT DOCUMENTS

| | | |
|---|---|---|
| JP | 2012-035812 A | 2/2012 |
| JP | 4889905 B2 | 3/2012 |
| JP | 6233009 B2 | 11/2017 |
| JP | 6376297 B2 | 8/2018 |
| JP | 2019-055704 A | 4/2019 |
| KR | 102136046 B1 | 7/2020 |

OTHER PUBLICATIONS

International Preliminary report on Patentability Issued in Corresponding International Application No. PCT/JP2021/041339, dated May 25, 2023 (9 pages with English Translation).

Extended European Search Report issued in counterpart European Application No. 21891904.1, dated Oct. 14, 2024 (10 pages).

* cited by examiner

VEHICLE AIR CONDITIONING SYSTEM AND VEHICLE AIR CONDITIONING METHOD

TECHNICAL FIELD

The present disclosure relates to an air conditioning system installed in a vehicle, the air conditioning system including a refrigerant circuit and a heat medium circuit, and to an air conditioning method using the air conditioning system.

BACKGROUND ART

In a vehicle such as an electric vehicle in which waste heat of an engine cannot be utilized, there is a need for heat management and waste heat utilization of on-board equipment such as a battery in addition to air conditioning functions required for the vehicle such as cooling, heating, dehumidification, and ventilation in a situation in which a heat source tends to be insufficient. To satisfy such a need, in the related art, a plurality of systems such as a system including a chiller for cooling a battery and a system for conveying water heated by waste heat of a radiator to a thermal load with a pump have been used in addition to an electric heater and a heat pump system.

As a system in which air conditioning and heat management are integrated, there has been proposed a system including a primary loop for circulating a refrigerant in accordance with a refrigeration cycle and a secondary loop for feeding a heat medium such as water, which gives and receives heat to and from the refrigerant in the primary loop, to on-board equipment with a pump (for example, Patent Document 1).

The automobile temperature control device described in Patent Document 1 includes a refrigerant circuit (primary loop) that takes heat from a low-temperature reservoir and transfers the heat to a high-temperature reservoir, and a first heat medium circuit (secondary loop) and a second heat medium circuit (secondary loop) that are connected to a cooler. The low-temperature reservoir includes a first refrigerant/heat medium heat exchanger thermally coupling the refrigerant circuit to the first heat medium circuit that is selectively connectable to an exterior heat exchanger, a low-temperature heat exchanger, and the cooler. The high-temperature reservoir includes a second refrigerant/heat medium heat exchanger thermally coupling the refrigerant circuit to the second heat medium circuit that is selectively connectable to an exterior heat exchanger, a high-temperature heat exchanger, and a cooler exchanger.

CITATION LIST

Patent Literature

Patent Document 1: JP 2003-533396 T

SUMMARY OF INVENTION

Technical Problem

According to the temperature control device described in Patent Document 1, the low-temperature reservoir and the high-temperature reservoir are used as heat sources, and the heat medium obtained by heat exchange with the refrigerant in each of the low-temperature reservoir and the high-temperature reservoir is fed to a plurality of on-board equipment, and thereby heat management of on-board equipment such as a battery and waste heat recovery in addition to air conditioning in a vehicle cabin can be realized as one integrated system.

Such a temperature control device has room for improvement from a viewpoint of achieving various operation modes, for example, a mode of performing heating while dehumidifying and a mode of cleaning a heat exchanger while performing air conditioning, at lower costs with a circuit configuration as simple as possible while achieving both air conditioning and thermal management of on-board equipment. For example, when a complicated operation using a large number of switching units provided on a heat medium circuit is required for switching between paths through which a heat medium flows, costs required for procurement of valves constituting the switching units and manufacture and operation of a system including a control unit of the valves are increased.

An object of the present invention is to improve an air conditioning system installed in a vehicle, the air conditioning system including a refrigerant circuit and a heat medium circuit.

Solution to Problem

A vehicle air conditioning system according to the present disclosure includes: a refrigerant circuit configured to circulate a refrigerant through a compressor, a heat-absorbing heat exchanger, a decompression unit, and a heat-dissipating heat exchanger in accordance with a refrigeration cycle; a heat medium circuit including a high-temperature heat medium circuit configured to circulate a high-temperature heat medium that absorbs heat from the refrigerant in the heat-absorbing heat exchanger and a low-temperature heat medium circuit configured to circulate a low-temperature heat medium that dissipates heat to the refrigerant in the heat-dissipating heat exchanger; a vehicle interior heat exchanger configured to exchange heat between air and at least one of the high-temperature heat medium and the low-temperature heat medium; a vehicle exterior heat exchanger configured to exchange heat between air and at least one of the high-temperature heat medium and the low-temperature heat medium; and a switching unit configured to switch flows of the high-temperature heat medium and the low-temperature heat medium in accordance with an operation mode of the vehicle air conditioning system.

The heat medium circuit supplies the high-temperature heat medium to at least one of the vehicle interior heat exchanger and the vehicle exterior heat exchanger and supplies the low-temperature heat medium to at least one of the vehicle interior heat exchanger and the vehicle exterior heat exchanger, in accordance with the operation mode. At least one of the vehicle interior heat exchanger and the vehicle exterior heat exchanger includes a first heat exchanger and a second heat exchanger that are connectable in series or in parallel in the heat medium circuit.

The switching unit switches the flow of the high-temperature heat medium on an upstream side and a downstream side of the heat-absorbing heat exchanger, switches the flow of the low-temperature heat medium on an upstream side and a downstream side of the heat-dissipating heat exchanger, and switches the connection of the first heat exchanger and the second heat exchanger between series connection and parallel connection.

A vehicle air conditioning method according to the present disclosure is a method using a vehicle air conditioning system including a refrigerant circuit configured to circulate a refrigerant in accordance with a refrigeration cycle, a heat medium circuit including a high-temperature heat medium circuit configured to circulate a high-temperature heat medium that absorbs heat from the refrigerant in a heat-absorbing heat exchanger in the refrigerant circuit and a low-temperature heat medium circuit configured to circulate a low-temperature heat medium that dissipates heat to the refrigerant in a heat-dissipating heat exchanger in the refrigerant circuit, a vehicle interior heat exchanger configured to exchange heat between air and at least one of the high-temperature heat medium and the low-temperature heat medium, and a vehicle exterior heat exchanger configured to exchange heat between air and at least one of the high-temperature heat medium and the low-temperature heat medium, at least one of the vehicle interior heat exchanger and the vehicle exterior heat exchanger including a first heat exchanger and a second heat exchanger being connectable in series or in parallel in the heat medium circuit, the method includes: switching a flow of the high-temperature heat medium on an upstream side and a downstream side of the heat-absorbing heat exchanger; switching a flow of the low-temperature heat medium on an upstream side and a downstream side of the heat-dissipating heat exchanger heat exchanger; and switching a connection of the first heat exchanger and the second heat exchanger between series connection and parallel connection in accordance with an operation mode of the vehicle air conditioning system.

Advantageous Effects of Invention

According to the vehicle air conditioning system and the vehicle air conditioning method using the vehicle air conditioning system of the present disclosure, the connection of the first heat exchanger and the second heat exchanger is switched to series connection or parallel connection by the switching unit so as to set respective paths of the high-temperature heat medium and the low-temperature heat medium, and thereby it is possible to implement various operation modes including, for example, cooling and heating modes in which the first and second heat exchangers are connected in series and other modes in which the first and second heat exchangers are connected in parallel with a simple structure and a simple control at low costs.

DESCRIPTION OF EMBODIMENTS

An embodiment will be described hereinafter with reference to the appended drawings.

First Embodiment

Figure 1:
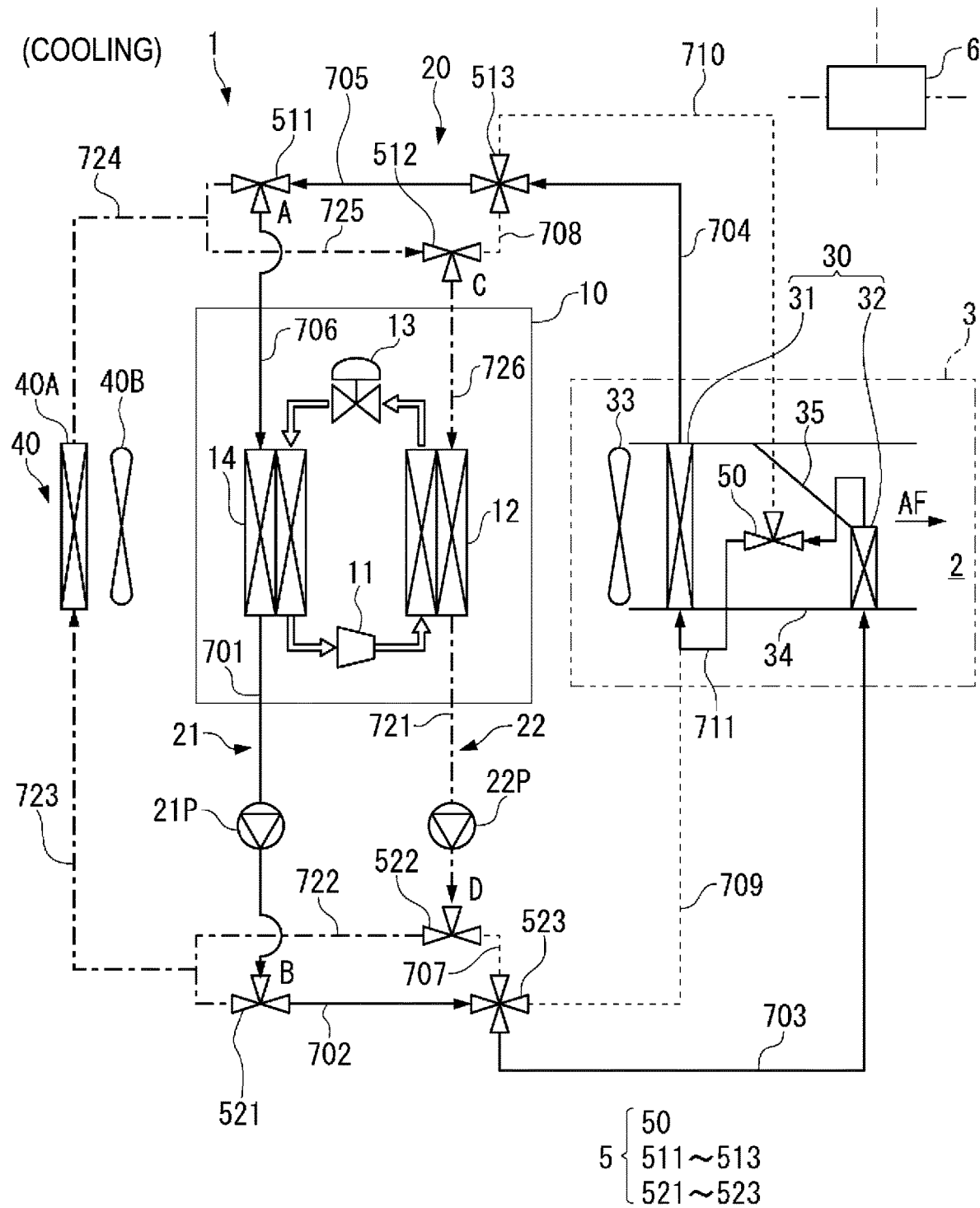
FIG. 1 is a diagram schematically illustrating a vehicle air conditioning system according to a first embodiment of the present disclosure. An example of respective paths of a low-temperature heat medium and a high-temperature heat medium in a cooling mode is illustrated.

A vehicle air conditioning system 1 illustrated in FIG. 1 is installed in a vehicle such as an electric vehicle which is not illustrated. The vehicle air conditioning system 1 performs heat management, waste heat recovery, and the like of on-board equipment, which is not illustrated, mounted on the vehicle in addition to air conditioning such as cooling, heating, dehumidifying, and ventilating in a vehicle cabin 2 in which a passenger sits.

Note that the vehicle in which the vehicle air conditioning system 1 is installed is not limited to an electric vehicle, and may be a vehicle equipped with an engine.

The vehicle air conditioning system 1 includes a refrigerant circuit 10 for circulating a refrigerant in accordance with a refrigeration cycle, a heat medium circuit 20 for circulating a heat medium that gives and receives heat to and from the refrigerant, a vehicle interior heat exchanger 30 for exchanging heat between the heat medium and air, a vehicle exterior heat exchanger 40 for exchanging heat between the heat medium and air, a switching unit 5 for switching a flow of the heat medium in the heat medium circuit 20 in accordance with an operation mode of the vehicle air conditioning system 1, and a control device 6 for controlling an operation of at least the switching unit in the vehicle air conditioning system 1.

Figure 2:
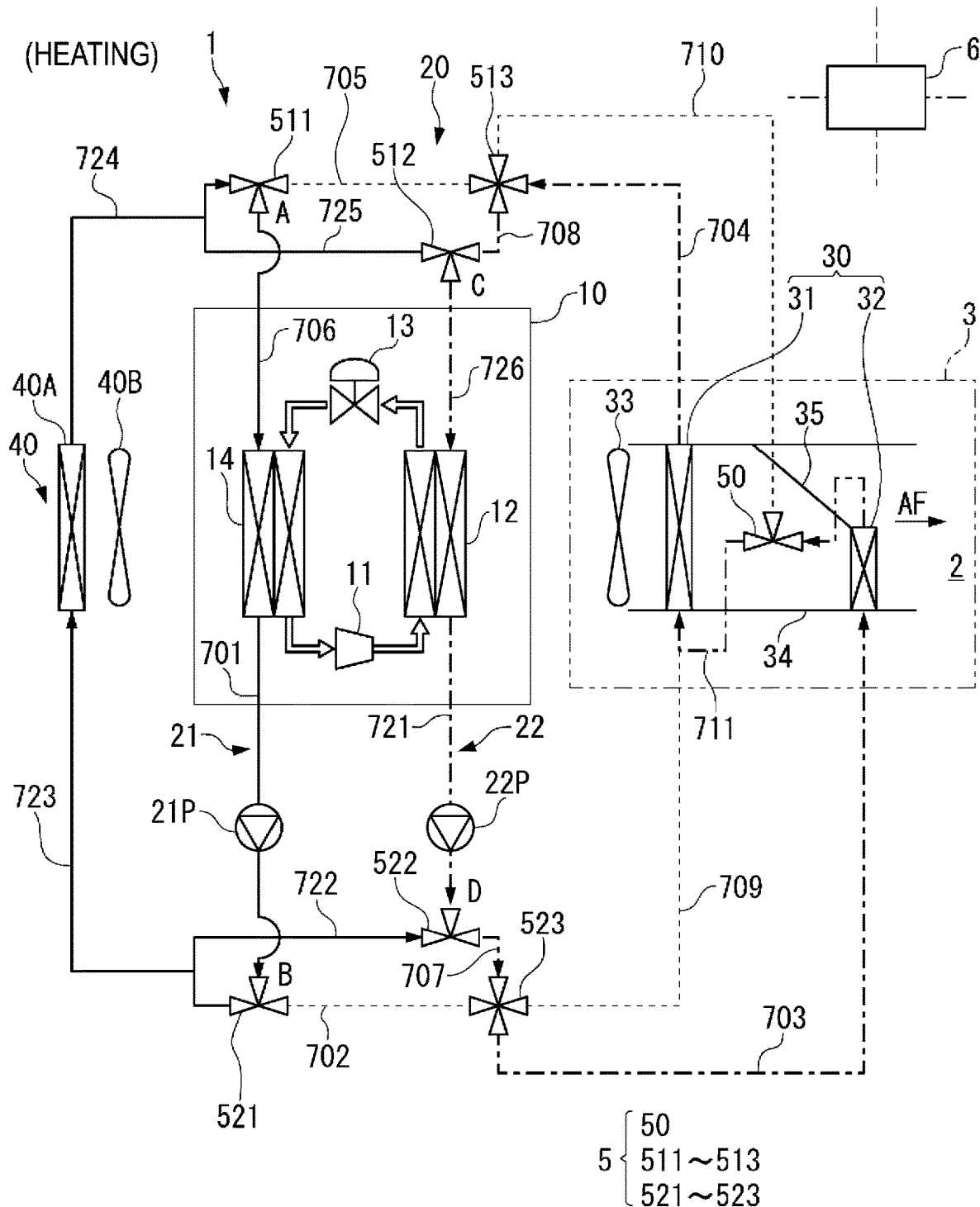
FIG. 2 is a diagram illustrating an example of respective paths of the low-temperature heat medium and the high-temperature heat medium in a heating mode of the vehicle air conditioning system illustrated in FIG. 1.

The vehicle air conditioning system 1 is switched into one mode among a plurality of operation modes such as a cooling mode illustrated in FIG. 1 and a heating mode illustrated in FIG. 2 by a user operation or control by the control device 6.

Refrigerant Circuit

The refrigerant circuit 10 includes a compressor 11 for compressing the refrigerant, a heat-absorbing heat exchanger 12, an expansion valve 13 as a decompression unit for reducing a pressure of the refrigerant that has passed through the compressor 11 and the heat-absorbing heat exchanger 12, and a heat-dissipating heat exchanger 14. The refrigerant circuit 10 generates a heat source (heat-absorbing heat exchanger 12) and a cold source (heat-dissipating heat exchanger 14) by a refrigeration cycle using outside air as a heat source.

The compressor 11, the heat-absorbing heat exchanger 12, the expansion valve 13, the heat-dissipating heat exchanger 14, and refrigerant pipes connecting these elements are disposed outside the vehicle cabin 2.

As the refrigerant, a publicly-known appropriate single refrigerant or mixed refrigerant can be used. For example, a hydrofluorocarbon (HFC) refrigerant such as R410A or R32, a hydrofluoroolefin (HFO) refrigerant such as R1234ze or R1234yf, a hydrocarbon (HC) series refrigerant such as propane or isobutane, or carbon dioxide can be used as the refrigerant.

The heat-absorbing heat exchanger 12 causes the heat medium to absorb heat from the refrigerant through heat exchange between a gas of the refrigerant discharged from the compressor 11 and the heat medium. Typically, the refrigerant is changed into a liquid phase through the heat exchange between the refrigerant and the heat medium in the heat-absorbing heat exchanger 12. In this case, the heat-absorbing heat exchanger 12 is equivalent to a condenser.

The heat-dissipating heat exchanger 14 causes the heat medium to dissipate heat to the refrigerant through heat exchange between the refrigerant that has passed through the expansion valve 13 and the heat medium. The heat-dissipating heat exchanger 14 is equivalent to an evaporator. The refrigerant changed into a gas phase in the heat-dissipating heat exchanger 14 is sucked into the compressor 11.

The refrigerant is circulated in the refrigerant circuit 10 by a difference between a pressure of the refrigerant in the heat-absorbing heat exchanger 12 and a pressure of the refrigerant in the heat-dissipating heat exchanger 14.

Heat Medium Circuit

The heat medium circuit 20 feeds the heat medium, which gives and receives heat to and from the heat source and the cold source in the refrigerant circuit 10, to the vehicle interior heat exchanger 30 and the vehicle exterior heat exchanger 40. The heat medium can be used for heat management such as heating and cooling of on-board equipment and waste heat recovery from the on-board equipment in addition to air conditioning in the vehicle cabin 2. The on-board equipment is, for example, a drive source such as an electric motor, a drive circuit, a power supply device including a battery, and the like.

The heat medium is a liquid such as water or brine that is circulated in the heat medium circuit 20 while being kept in a liquid phase state. As the brine, for example, a mixed liquid of water and propylene glycol or a mixed liquid of water and ethylene glycol can be exemplified.

In the heat medium circuit 20, a heat medium having a relatively high temperature (high-temperature heat medium) and a heat medium having a relatively low temperature (low-temperature heat medium) are respectively circulated. In both the cooling mode and the heating mode, the high-temperature heat medium absorbs heat from the refrigerant in the heat-absorbing heat exchanger 12, and the low-temperature heat medium dissipates heat to the refrigerant in the heat-dissipating heat exchanger 14.

In FIG. 1, the flow of the low-temperature heat medium is indicated by solid line arrows, and the flow of the high-temperature heat medium is indicated by dashed-dotted line arrows. In the heat medium circuit 20, a path through which the heat medium does not flow is indicated by a dashed line. The same applies to FIG. 2 and subsequent drawings.

The high-temperature heat medium is circulated through a predetermined path in the heat medium circuit 20 according to an operation mode, for example, as indicated by the dashed-dotted line arrows in FIG. 1. The low-temperature heat medium is circulated through a path in the heat medium circuit 20 according to an operation mode, for example, as indicated by solid line arrows in FIG. 1.

The heat medium circuit 20 is divided into a low-temperature heat medium circuit 21 for circulating the low-temperature heat medium and a high-temperature heat medium circuit 22 for circulating the high-temperature heat medium by the switching unit 5 that switches the flow of the heat medium. FIG. 1 illustrates A to D in the heat medium circuit 20. Only the low-temperature heat medium flows from A to B. Only the high-temperature heat medium flows from C to D. In the remaining sections of the heat medium circuit 20, either the low-temperature heat medium or the high-temperature heat medium flows according to an operation mode. The high-temperature heat medium is pumped through the high-temperature heat medium circuit 22 by a pump 22P located downstream of the heat-absorbing heat exchanger 12. The low-temperature heat medium is pumped through the low-temperature heat medium circuit 21 by a pump 21P located downstream of the heat-dissipating heat exchanger 14.

Even if an outside temperature is so low that it is difficult for the refrigerant circuit 10 alone to provide a heating capacity, the heating capacity at a low outside temperature can be ensured because the heat medium circuit 20 stably feeding the heat medium that does not change in phase in an operating temperature range with the pumps 21P and 22P is used in combination with the refrigerant circuit 10.

In the cooling mode (FIG. 1), the low-temperature heat medium is circulated between the heat-dissipating heat exchanger 14 and the vehicle interior heat exchanger 30 through pipes of the heat medium circuit 20 and used for cooling in the vehicle cabin 2. At this time, the high-temperature heat medium is circulated between the heat-absorbing heat exchanger 12 and the vehicle exterior heat exchanger 40 through pipes of the heat medium circuit 20.

On the other hand, in the heating mode (FIG. 2), the high-temperature heat medium is circulated between the heat-absorbing heat exchanger 12 and the vehicle interior heat exchanger 30 through pipes of the heat medium circuit and used for heating in the vehicle cabin 2. At this time, the low-temperature heat medium is circulated between the heat-dissipating heat exchanger 14 and the vehicle exterior heat exchanger 40 through pipes of the heat medium circuit 20.

In any operation mode, the heat medium circuit 20 supplies the high-temperature heat medium to at least one of the vehicle interior heat exchanger and the vehicle exterior heat exchanger 40, and supplies the low-temperature heat medium to at least one of the vehicle interior heat exchanger 30 and the vehicle exterior heat exchanger 40.

Vehicle Interior Heat Exchanger

The vehicle interior heat exchanger 30 includes a first heat exchanger 31 (first interior heat exchanger) and a second heat exchanger 32 (second interior heat exchanger) that can be connected in series or in parallel with respect to the flow of the heat medium, that is, in the heat medium circuit 20. The first heat exchanger 31 and the second heat exchanger 32 are disposed inside a console, a wall, or the like of the vehicle cabin 2, and exchange heat between the low-temperature heat medium or the high-temperature heat medium supplied to the first heat exchanger 31 and the second heat exchanger 32 and air inside the vehicle cabin 2 or outside the vehicle cabin 2.

The vehicle interior heat exchanger 30 may include another heat exchanger, on-board equipment, a member, and the like. For example, either of the high-temperature heat medium or the low-temperature heat medium of the heat medium circuit 20 can be supplied to a heat exchanger, on-board equipment, or a member included in the vehicle interior heat exchanger 30 for cooling, heat management, or waste heat recovery of the on-board equipment.

Figure 3:
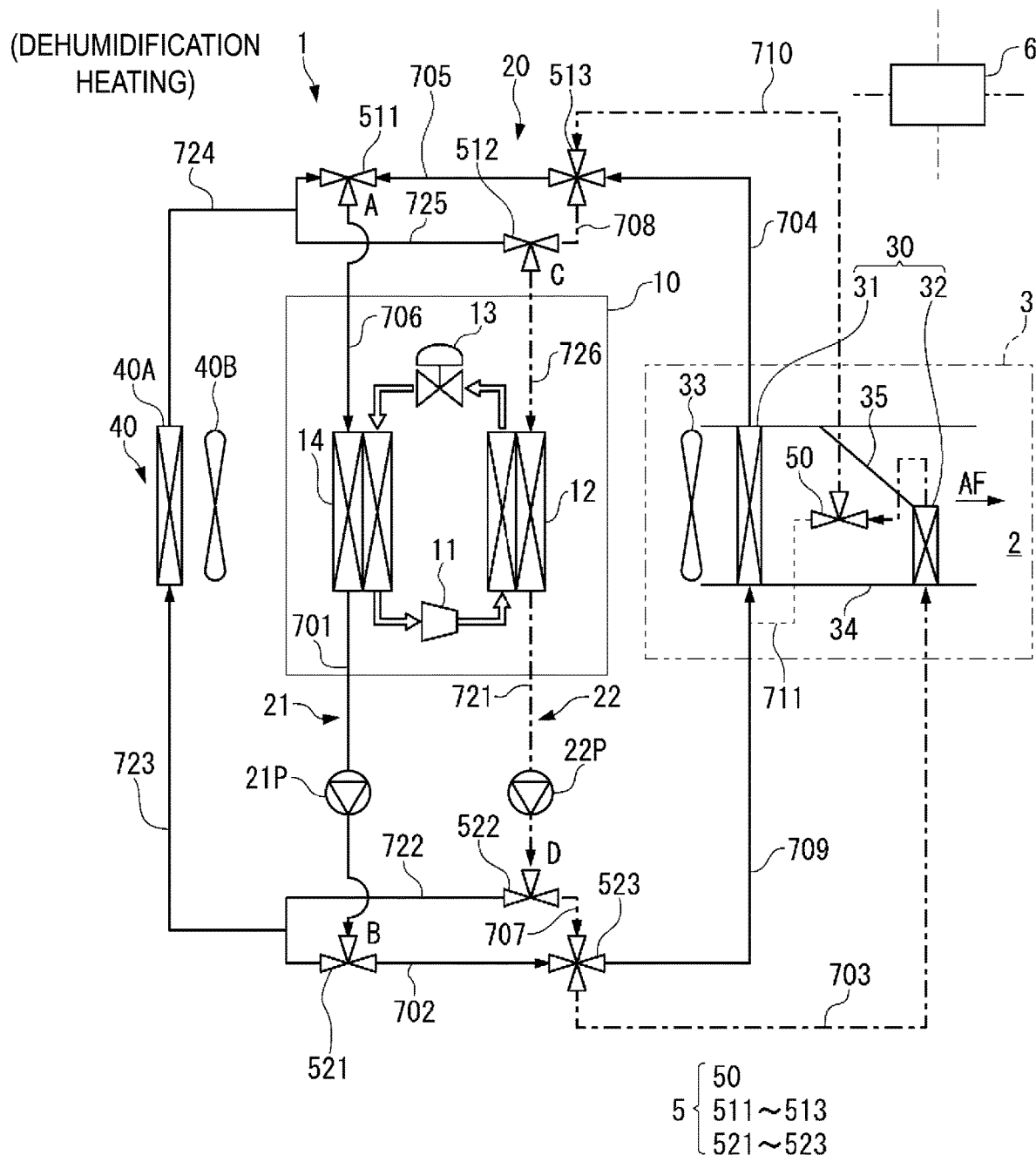
FIG. 3 is a diagram illustrating an example of respective paths of the low-temperature heat medium and the high-temperature heat medium in a dehumidification heating mode of the vehicle air conditioning system illustrated in FIG. 1.

The connection state of the first heat exchanger 31 and the second heat exchanger 32 is switched between series connection illustrated in FIGS. 1 and 2 and parallel connection illustrated in FIG. 3 and the like with respect to the flow of the heat medium by an intermediate valve 50 as a part of the switching unit 5 disposed in a path connecting the first heat exchanger 31 and the second heat exchanger 32. In a case of the series connection, the second heat exchanger 32 is located upstream and the first heat exchanger 31 is located downstream in the heat medium circuit 20 regardless of an operation mode such as cooling or heating. The heat medium flowing out of the second heat exchanger 32 flows into the first heat exchanger 31 via the intermediate valve 50.

The first heat exchanger 31 and the second heat exchanger 32 constitute a heating, ventilation, and air conditioning (HVAC) unit 3 together with a blower 33 (air blower), a duct 34 (air guide path) through which air sent by the blower 33 flows, a damper 35 whose degree of opening can be adjusted, and the like. The first heat exchanger 31 is located upwind in the duct 34, and the second heat exchanger 32 is located downwind in the duct 34.

Air inside the vehicle cabin 2 or air outside the vehicle cabin 2 (outside air) is sucked by the blower 33, and sent to the first heat exchanger 31 and the second heat exchanger 32 through the duct 34. A flow direction of the air sent from the blower 33 is indicated by an arrow AF. As illustrated in FIG. 1, when a flow path of the duct 34 is closed by the damper 35 located downwind in the duct 34, the entire amount of the air that has passed through the first heat exchanger 31 is introduced into the second heat exchanger 32. Air cooled through heat exchange with the low-temperature heat medium or air heated through heat exchange with the high-temperature heat medium in both the first heat exchanger 31 and the second heat exchanger 32 is blown out into the vehicle cabin 2 from an outlet not illustrated.

In the present embodiment, the first heat exchanger 31 and the second heat exchanger 32 are arranged in series with respect to the flow of air sent from the blower 33. The flow of the air sequentially flowing through the first heat exchanger 31 and the second heat exchanger 32 and the flow of the heat medium sequentially flowing through the second heat exchanger 32 and the first heat exchanger 31 form counterflows. Thus, heat exchange can be efficiently performed while temperature differential between the air and the heat medium is sufficiently maintained throughout an entire heat exchange process by the first heat exchanger 31 and the second heat exchanger 32.

Especially, when the first heat exchanger 31 and the second heat exchanger 32 are connected in parallel and, for example, the high-temperature heat medium flows through one of the first heat exchanger 31 and the second heat exchanger 32 and the low-temperature heat medium flows through the other as illustrated in FIG. 3, the temperature of the air blown out from the unit 3 can be adjusted by adjusting the degree of opening of the damper 35. The air that has passed through the first heat exchanger 31 is introduced into the second heat exchanger 32 at a ratio according to the degree of opening of the damper 35. By adjusting the degree of opening of the damper 35, a mixing ratio of the air that has passed through both the first heat exchanger 31 and the second heat exchanger 32 and the air that has passed through only the first heat exchanger 31 can be varied in accordance with a target temperature.

Vehicle Exterior Heat Exchanger

The vehicle exterior heat exchanger 40 includes an exterior heat exchanger 40A for exchanging heat between air taken in from the outside of the vehicle cabin 2 and the low-temperature heat medium or the high-temperature heat medium. The exterior heat exchanger 40A is equivalent to, for example, a radiator disposed in the vicinity of an air introduction port of the vehicle. Heat can be dissipated from the heat medium to air by the exterior heat exchanger and the air can be discharged to the outside of the vehicle by an air blower 40B or the like.

Switching Unit

The switching unit 5 includes the above-described intermediate valve 50 located between the first heat exchanger 31 and the second heat exchanger 32, and upstream valves 511 to 513 and downstream valves 521 to 523 disposed in the heat medium circuit 20. The switching unit 5 switches the respective flows of the high-temperature heat medium and the low-temperature heat medium by these valves 50, 511 to 513, and 521 to 523.

Each of the valves 50, 511 to 513, and 521 to 523 is a solenoid valve, and is opened and closed in accordance with a control command issued by the control device 6.

Each of the intermediate valve 50, the upstream valve 511, and the upstream valve 512 described above is a three-way valve, and the upstream valve 513 is a four-way valve. Each of the downstream valve 521 and the downstream valve 522 is a three-way valve, and the downstream valve 523 is a four-way valve. The ports of each valve is selectively opened or closed in accordance with an operation mode, and the heat medium flows through the heat medium circuit 20 along a flow path set inside each valve.

The number and the arrangement of the valves of the switching unit 5 according to the present embodiment, and the setting of the respective paths of the low-temperature heat medium and the high-temperature heat medium in each operation mode depending on the number and the arrangement, and the like are only examples. In order to realize the respective flows of the low-temperature heat medium and the high-temperature heat medium in each operation mode provided in the vehicle air conditioning system 1, a switching unit having an appropriate configuration can be employed.

The upstream valves 511 to 513 are located upstream in the heat medium circuit 20 with respect to the heat-absorbing heat exchanger 12 and the heat-dissipating heat exchanger 14. The downstream valves 521 to 523 are located downstream in the heat medium circuit 20 with respect to the heat-absorbing heat exchanger 12 and the heat-dissipating heat exchanger 14. When the open/close state of the intermediate valve 50, the open/close state of each of the upstream valves 511 to 513, and the open/close state of each of the downstream valves 521 to 523 are controlled in accordance with an operation mode, a predetermined corresponding to the open/close states of the respective valves is provided to each of the low-temperature heat medium and the high-temperature heat medium, and supply destination of the heat medium fed by the heat medium circuit 20 are switched.

Cooling Mode

Hereinafter, each operation mode of the vehicle air conditioning system 1 will be described. It is assumed that the refrigerant circuit 10 is operated in each operation mode and the refrigerant is circulated through the refrigerant circuit 10.

The connections of valves and pipes, the order of processing, and the like described below are only examples, and another operation mode of the vehicle air conditioning system 1 can be realized by appropriately setting the paths of the high-temperature heat medium and the low-temperature heat medium.

As another operation mode, for example, a defrosting mode in which frost adhering to the exterior heat exchanger 40A on a vehicle exterior side is melted and removed by supplying the high-temperature heat medium can be given.

The vehicle air conditioning system 1 does not necessarily need to have all the operation modes described below. Necessary operation modes vary depending on a region in which the vehicle is used. For example, it is permissible for the vehicle air conditioning system 1 not to have a cooling mode.

First, the cooling mode illustrated in FIG. 1 will be described. When the cooling mode is set, the control device 6 gives a control command corresponding to the cooling mode to each valve of the switching unit 5. At this time, the first heat exchanger 31 and the second heat exchanger 32 are connected in series via the intermediate valve 50.

In the cooling mode, the low-temperature heat medium (indicated by the solid lines) that has dissipated heat to the refrigerant in the heat-dissipating heat exchanger 14 and has flowed out from the heat-dissipating heat exchanger 14 to a pipe 701 sequentially flows through a pipe 702 and a pipe 703 and is supplied to the second heat exchanger 32 of the vehicle interior heat exchanger in accordance with the open/close state of each port of the downstream valve 521 and the downstream valve 523. The low-temperature heat medium gives and receives heat to and from the air sent by the blower 33 in the process of sequentially flowing through both the second heat exchanger 32 and the first heat exchanger 31. As a result, the air cooled through heat absorption by the low-temperature heat medium is blown into the vehicle cabin 2. The low-temperature heat medium that has flowed out from the first heat exchanger 31 to a pipe 704 sequentially flows through pipes 705 and 706 and returns to the heat-dissipating heat exchanger 14 in accordance with the open/close states of the upstream valves 513 and 511.

On the other hand, the high-temperature heat medium (indicated by the dashed-dotted lines) that has absorbed heat from the refrigerant in the heat-absorbing heat exchanger 12 and has flowed out from the heat-absorbing heat exchanger 12 to a pipe 721, sequentially flows through the downstream valve 522, a pipe 722, and a pipe 723, and is supplied to the exterior heat exchanger of the vehicle exterior heat exchanger 40. Waste heat of the vehicle air conditioning system 1 can be discharged to outside air through heat exchange between the high-temperature heat medium and the outside air in the exterior heat exchanger 40A. The high-temperature heat medium that has flowed out from the exterior heat exchanger 40A to a pipe 724 sequentially flows through pipes 725 and 726 and returns to the heat-absorbing heat exchanger 12 in accordance with the open/close states of the upstream valves 511 and 512.

Heating Mode

When the heating mode illustrated in FIG. 2 is set, the ports of each valve of the switching unit 5 are opened or closed and the paths of the high-temperature heat medium and the low-temperature heat medium are switched in accordance with a control command issued by the control device 6. Also in the heating mode, the first heat exchanger 31 and the second heat exchanger 32 are connected in series via the intermediate valve 50.

In the heating mode, the high-temperature heat medium that has absorbed heat from the refrigerant in the heat-absorbing heat exchanger 12 and has flowed out from the heat-absorbing heat exchanger 12 to the pipe 721 sequentially flows through a pipe 707 and the pipe 703 and is supplied to the second heat exchanger 32 in accordance with the open/close states of the ports of the downstream valve 522 and the downstream valve 523. The high-temperature heat medium dissipates heat to the air sent by the blower 33 while sequentially flowing through both the second heat exchanger 32 and the first heat exchanger 31, and thereby the heated air is blown out from the HVAC unit 3. The high-temperature heat medium that has flowed out from the first heat exchanger 31 to the pipe 704 sequentially flows through a pipe 708 and the pipe 726 and returns to the heat-absorbing heat exchanger 12 in accordance with the open/close states of the upstream valves 513 and 512.

On the other hand, the low-temperature heat medium that has dissipated heat to the refrigerant in the heat-dissipating heat exchanger 14 and has flowed out from the heat-dissipating heat exchanger 14 to the pipe 701, sequentially flows through the downstream valve 521 and the pipe 723, and is supplied to the exterior heat exchanger 40A of the vehicle exterior heat exchanger 40. The heat medium can absorb heat from outside air through heat exchange between the low-temperature heat medium and the outside air in the exterior heat exchanger 40A. The low-temperature heat medium that has flowed out from the exterior heat exchanger 40A to the pipe 724 flows through the pipe 706 and returns to the heat-dissipating heat exchanger 14 in accordance with the open/close states of the upstream valves 511 and 512.

Dehumidification Heating

The dehumidification heating mode illustrated in FIG. 3 can be set so as to prevent a window glass of the vehicle from being fogged by the breath of a passenger or the like. In the dehumidification heating mode, the amount of water vapor in air is reduced by removing heat from the air by the low-temperature heat medium, and then the air is heated by the high-temperature heat medium. Thereby conditioned air is obtained. For this reason, unlike the cooling mode and the heating mode described above, the low-temperature heat medium is supplied to the first heat exchanger 31 on an upwind side, and the high-temperature heat medium is supplied to the second heat exchanger 32 on a downwind side in a state where the first heat exchanger 31 and the second heat exchanger 32 are connected in parallel.

The first heat exchanger 31 and the second heat exchanger 32 are connected in parallel by switching the open/close states of the valves 50, 513, and 523 in accordance with a control command issued by the control device 6. Then, pipes 709 and 710 that are not used in the cooling and heating modes are used. The pipe 709 connects the downstream valve 523 and the first heat exchanger 31. The pipe 710 connects the intermediate valve 50 and the upstream valve 513. A pipe 711 connecting the intermediate valve 50 and the second heat exchanger 32 is not used.

In the dehumidification heating mode, similarly to the heating mode (FIG. 2), the high-temperature heat medium that has absorbed heat from the refrigerant in the heat-absorbing heat exchanger 12 and has flowed out from the heat-absorbing heat exchanger 12 to the pipe 721 sequentially flows through the pipe 707 and the pipe 703 and is supplied to the second heat exchanger 32 in accordance with the open/close states of the ports of the downstream valve 522 and the downstream valve 523. The high-temperature heat medium dissipates heat to air in the process of flowing through only the second heat exchanger 32 out of the first heat exchanger 31 and the second heat exchanger 32, and then flows out to the pipe 710 via the intermediate valve 50 without flowing through the first heat exchanger 31. The high-temperature heat medium further flows through the upstream valves 513 and 512 and returns to the heat-absorbing heat exchanger 12.

The low-temperature heat medium flows out from the heat-dissipating heat exchanger 14 to the pipe 701, and then branches into the pipe 723 and the pipe 702 at the downstream valve 521. The low-temperature heat medium is supplied to the vehicle exterior heat exchanger 40 through the pipe 723, and is supplied to the first heat exchanger 31 through the pipe 702, the downstream valve 523, and the pipe 709.

Air taken in from the vehicle cabin 2 and sent to the first heat exchanger 31 by the blower 33 is cooled by the low-temperature heat medium. Thereby, an amount of water vapor in the air exceeding the amount of saturated vapor drops as water droplets from a surface of the first heat exchanger 31 so as to be collected. Accordingly, the humidity of air in the vehicle cabin 2 is gradually reduced through a dehumidification heating operation. The air whose water vapor amount has been reduced by the first heat exchanger 31 is heated by the high-temperature heat medium in the second heat exchanger 32, and is blown into the vehicle cabin 2.

In the dehumidification heating mode, a mixing ratio of the air that has passed through both the first heat exchanger 31 and the second heat exchanger 32 and the air that has passed through only the first heat exchanger 31 is varied by adjusting the degree of opening of the damper 35 in accordance with a control command issued by the control device 6. Thereby, the temperature of the air blown into the vehicle cabin 2 can be adjusted.

Freeze Cleaning Mode

Figure 4A:
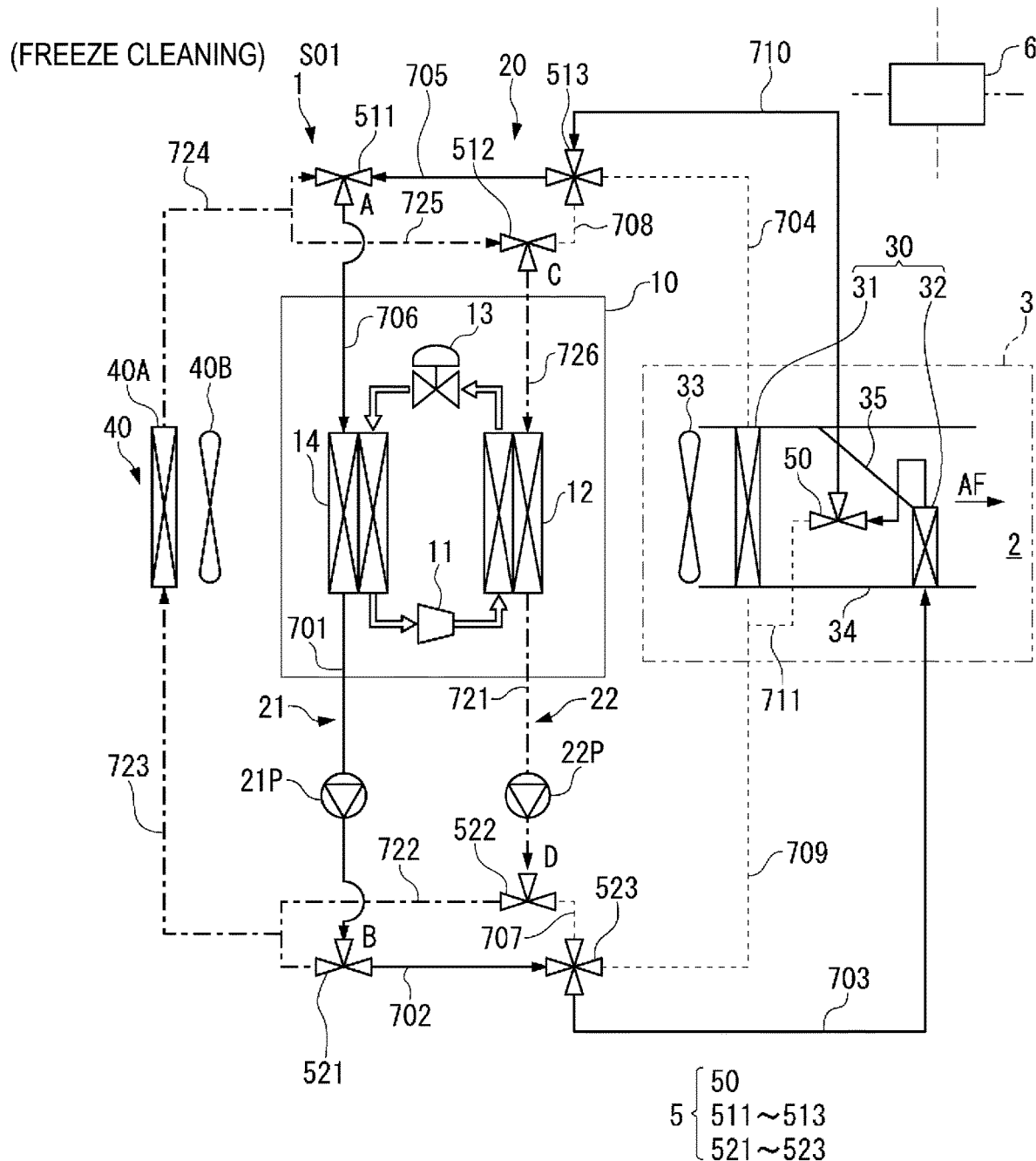
FIG. 4A is a diagram illustrating an example of respective paths of the low-temperature heat medium and the high-temperature heat medium in a first step of a freeze cleaning mode of the vehicle air conditioning system illustrated in FIG. 1.
Figure 4B:
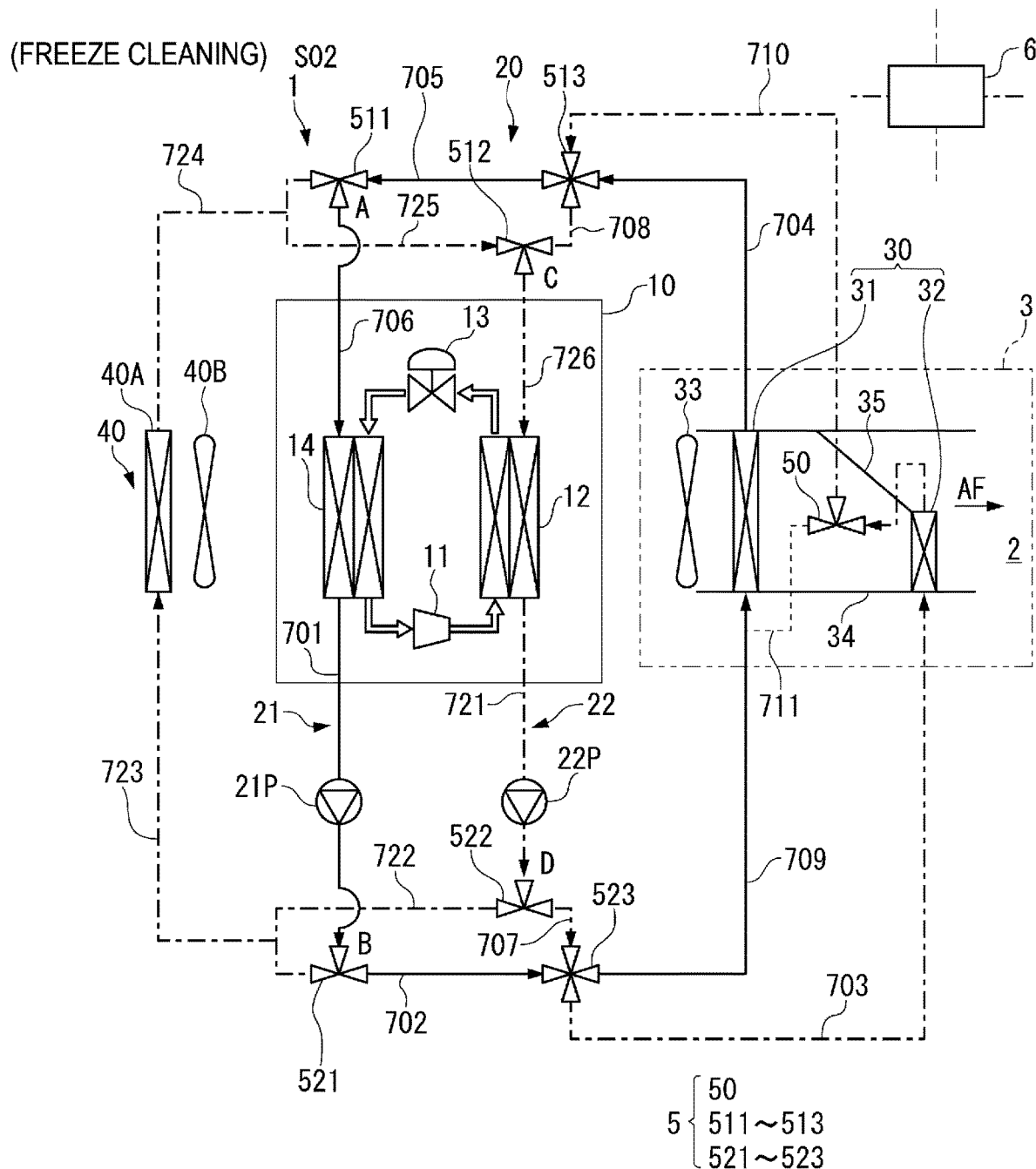
FIG. 4B is a diagram illustrating an example of respective paths of the low-temperature heat medium and the high-temperature heat medium in a second step of the freeze cleaning mode.
Figure 4C:
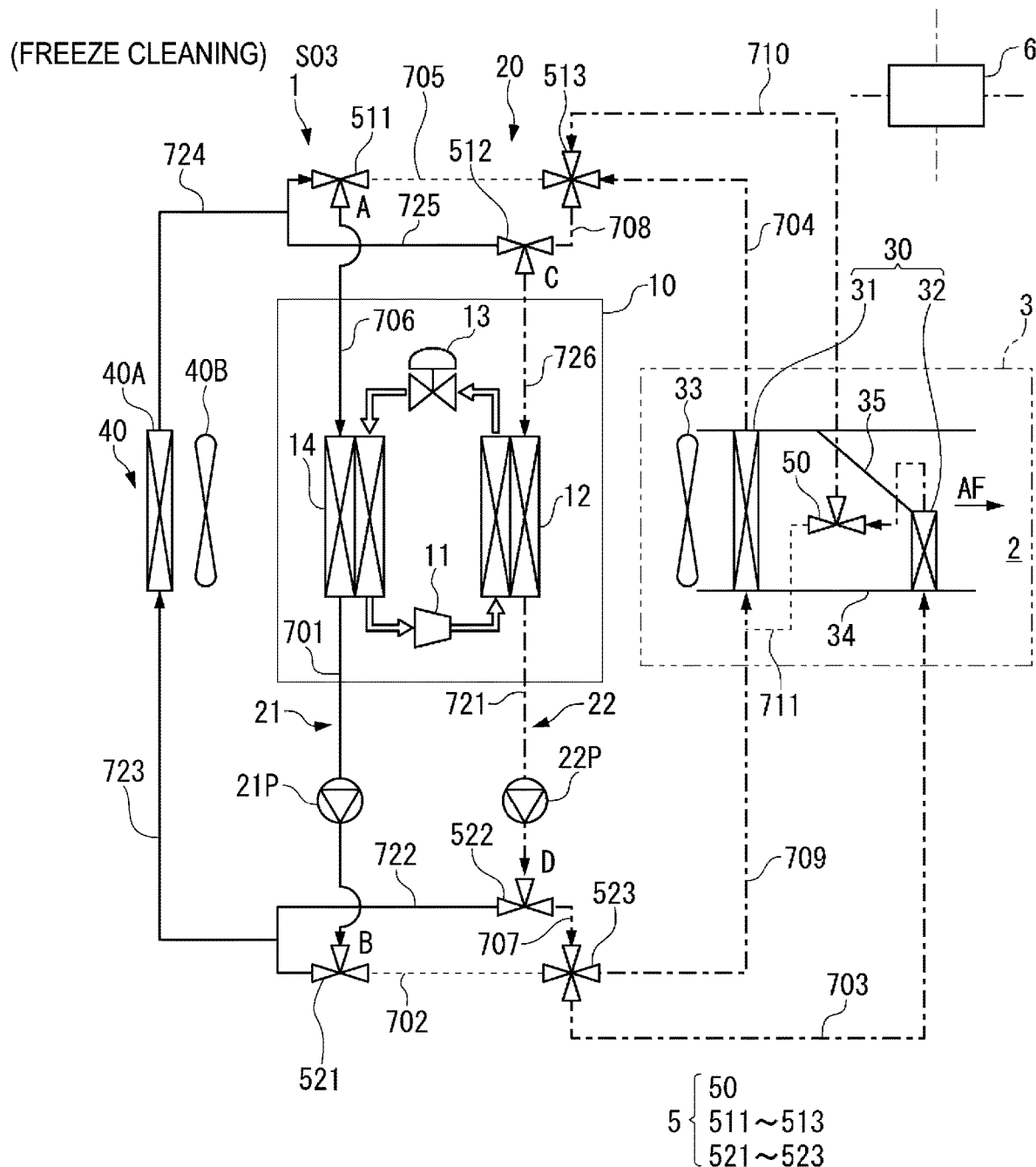
FIG. 4C is a diagram illustrating an example of respective paths of the low-temperature heat medium and the high-temperature heat medium in a third step of the freeze cleaning mode.

The freeze cleaning mode illustrated in FIGS. 4A to 4C can be set so as to keep the first heat exchanger 31 and the second heat exchanger 32, which are in contact with the air blown into the vehicle cabin 2, clean. In the freeze cleaning mode, for example, moisture in air is frozen (frost is formed) on a surface of the first heat exchanger 31 by supplying the low-temperature heat medium, and then the frost is melted by supplying the high-temperature heat medium to wash off the surface of the heat exchanger with water. It is preferable to dry the surface of the heat exchanger by continuously supplying the high-temperature heat medium.

As in steps S01 to S03 described below, by causing a freeze cleaning process on one of the first heat exchanger 31 and the second heat exchanger 32 to precede a freeze cleaning process on the other, part of processing on the first heat exchanger 31 and the second heat exchanger 32 can be performed in parallel.

First Step S01:

As illustrated in FIG. 4A, the low-temperature heat medium is supplied to only the second heat exchanger 32 out of the first heat exchanger 31 and the second heat exchanger 32 while the blower 33 is operated so as to form frost on a surface of the second heat exchanger 32. At this time, it is preferable that outside air having a higher humidity than the air in the vehicle cabin 2 is sent by the blower 33. In addition, in order to supply the low-temperature heat medium at a flow rate sufficient to promote frost formation, it is preferable to increase the freezing capacity of the refrigerant circuit 10 and the feeding capacity of the heat medium circuit 20 as compared to those in a steady operation.

In the first step S01, the first heat exchanger 31 is not connected to the heat medium circuit 20. Thus, neither the high-temperature heat medium nor the low-temperature heat medium is supplied to the first heat exchanger 31. All the ports of the valves 523, 513, and 50 respectively corresponding to the pipes 704, 709, and 711 connected to the first heat exchanger 31 are closed.

Second Step S02:

The second step S02 (FIG. 4B) and the subsequent third step S03 (FIG. 4C) are performed in a state in which the first heat exchanger 31 and the second heat exchanger 32 are connected in parallel in accordance with the open/close states of the valves 50, 513, and 523.

In the second step S02 illustrated in FIG. 4B, the high-temperature heat medium is supplied to the second heat exchanger 32 by switching the open/close states of the valves 522 and 523. The frost adhering to the surface of the second heat exchanger 32 in the first step S01 is melted by the heat of the high-temperature heat medium. Water generated by the melting flows down along the surfaces of fins and tubes of the second heat exchanger 32, and thereby dirt such as dust adhering to the surfaces of the fins and the tubes is washed away together with the water. After the water is drained from the surface of the second heat exchanger 32, the surface is drying through heating by the high-temperature heat medium. In the subsequent third step S03, the high-temperature heat medium is continuously supplied to the second heat exchanger 32 so as to sufficiently dry the second heat exchanger 32 and remove moisture from the surface of the second heat exchanger 32.

In parallel with the cleaning of the second heat exchanger 32 with the melt water, the low-temperature heat medium is supplied to the first heat exchanger 31 by switching the open/close states of the valves 523 and 513, and thereby frost is formed on the first heat exchanger 31. At this time, as in the first step S01, it is preferable that outside air having a higher humidity than the air in the vehicle cabin 2 is sent by the blower 33, and the freezing capacity of the refrigerant circuit 10 and the feeding capacity of the heat medium circuit 20 are increased as compared to those in a steady operation.

When sufficient frost is formed on a surface of the first heat exchanger 31, the processing proceeds to the third step S03.

Third Step S03:

In the third step S03 illustrated in FIG. 4C, the high-temperature heat medium is supplied to the first heat exchanger 31 by switching the open/close states of the valves 521 and 522. The frost adhering to the surface of the first heat exchanger 31 in the second step S02 is melted by the heat of the high-temperature heat medium, and dust and the like on fins and tubes is washed away together with water generated by the melting.

In the third step S03, the high-temperature heat medium can be supplied to both the first heat exchanger 31 and the second heat exchanger 32 through two ports of the valve 523.

When the drying of the surfaces of the first heat exchanger 31 and the second heat exchanger 32 is finished, the freeze cleaning mode is ended.

The freeze cleaning mode corresponds to a maintenance mode that does not necessarily contribute to air conditioning in the vehicle cabin 2. As in the second step S02 (FIG. 4B), the freezing of one of the two heat exchangers 31 and 32 and the melting of the other are performed in parallel, and thus a time from the start to the end of the freeze cleaning mode can be reduced. Upon ending of the freeze cleaning mode, the cooling mode or the heating mode can be executed.

As described in the procedure above, when the freezing of the second heat exchanger 32 on the downwind side precedes the freezing of the first heat exchanger 31 on the upwind side (first step S01), the defrosting and the drying of the second heat exchanger 32 and the freezing of the first heat exchanger 31 are performed in parallel in the subsequent second step S02. In the second step S02, the first heat exchanger 31 on the upwind side is easily frozen due to the inflow of the low-temperature heat medium.

Main Effects

According to the vehicle air conditioning system 1 and the air conditioning method using the vehicle air conditioning system 1 of the present embodiment, the connection of the first heat exchanger 31 and the second heat exchanger 32 as the vehicle interior heat exchanger 30 is switched to series connection or parallel connection by the switching unit 5 so as to set the respective paths of the high-temperature heat medium and the low-temperature heat medium, and thereby it is possible to implement various operation modes including the cooling and heating modes in which the first and second heat exchangers 31, 32 are connected in series and the dehumidification heating/freeze cleaning modes in which the first and second heat exchangers 31, 32 are connected in parallel with a simple structure and a simple control at low costs.

Second Embodiment

Next, a vehicle air conditioning system 1-2 according to a second embodiment will be described with reference to FIGS. 5, 6, 7A, and 7B. Hereinafter, differences from the first embodiment will be mainly described briefly. Elements that are the same as those in the first embodiment will be given the same reference signs.

Figure 5:
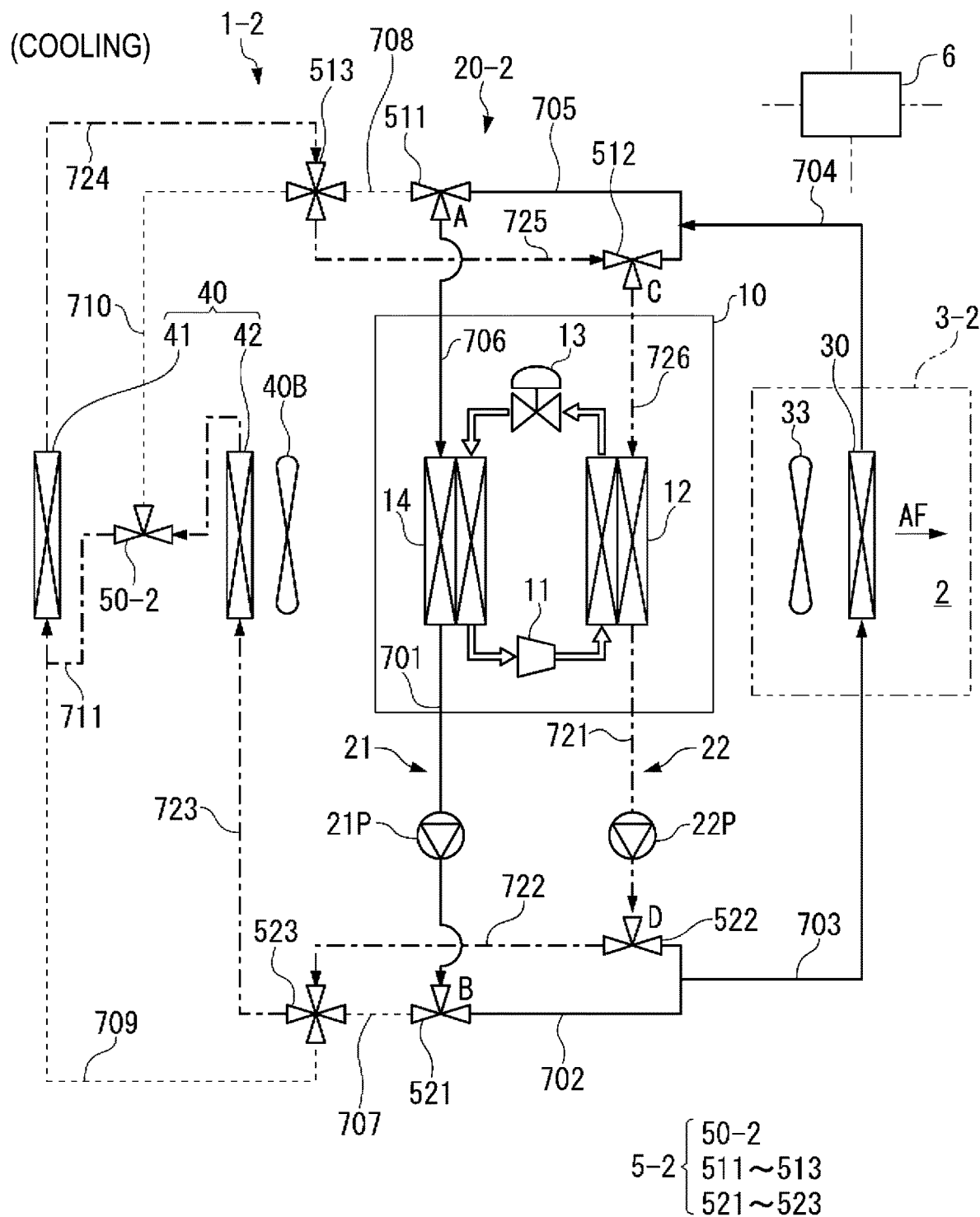
FIG. 5 is a diagram schematically illustrating a vehicle air conditioning system according to a second embodiment of the present disclosure. An example of respective paths of a low-temperature heat medium and a high-temperature heat medium in a cooling mode is illustrated.

As illustrated in FIG. 5, the vehicle air conditioning system 1-2 includes a first heat exchanger 41 (a first exterior heat exchanger) and a second heat exchanger 42 (a second exterior heat exchanger) constituting the vehicle exterior heat exchanger 40. An HVAC unit 3-2 of the present embodiment includes a single heat exchanger 30.

The vehicle exterior heat exchanger 40 may include another heat exchanger, on-board equipment, a member, and the like. For example, either of a high-temperature heat medium or a low-temperature heat medium in a heat medium circuit 20-2 can be supplied to a heat exchanger, on-board equipment, or a member included in the vehicle exterior heat exchanger 40 for cooling, heat management, or waste heat recovery, or the like of the on-board equipment.

The vehicle air conditioning system 1-2 may include the first heat exchanger 41 and the second heat exchanger 42 as the vehicle exterior heat exchanger 40, and may include the first heat exchanger 31 and the second heat exchanger 32 as the vehicle interior heat exchanger 30 as in the first embodiment.

The connection of the first heat exchanger 41 and the second heat exchanger 42 can be switched to series connection or parallel connection with respect to the flow of the heat medium by a switching unit 5-2 including an intermediate valve 50-2.

Figure 6:
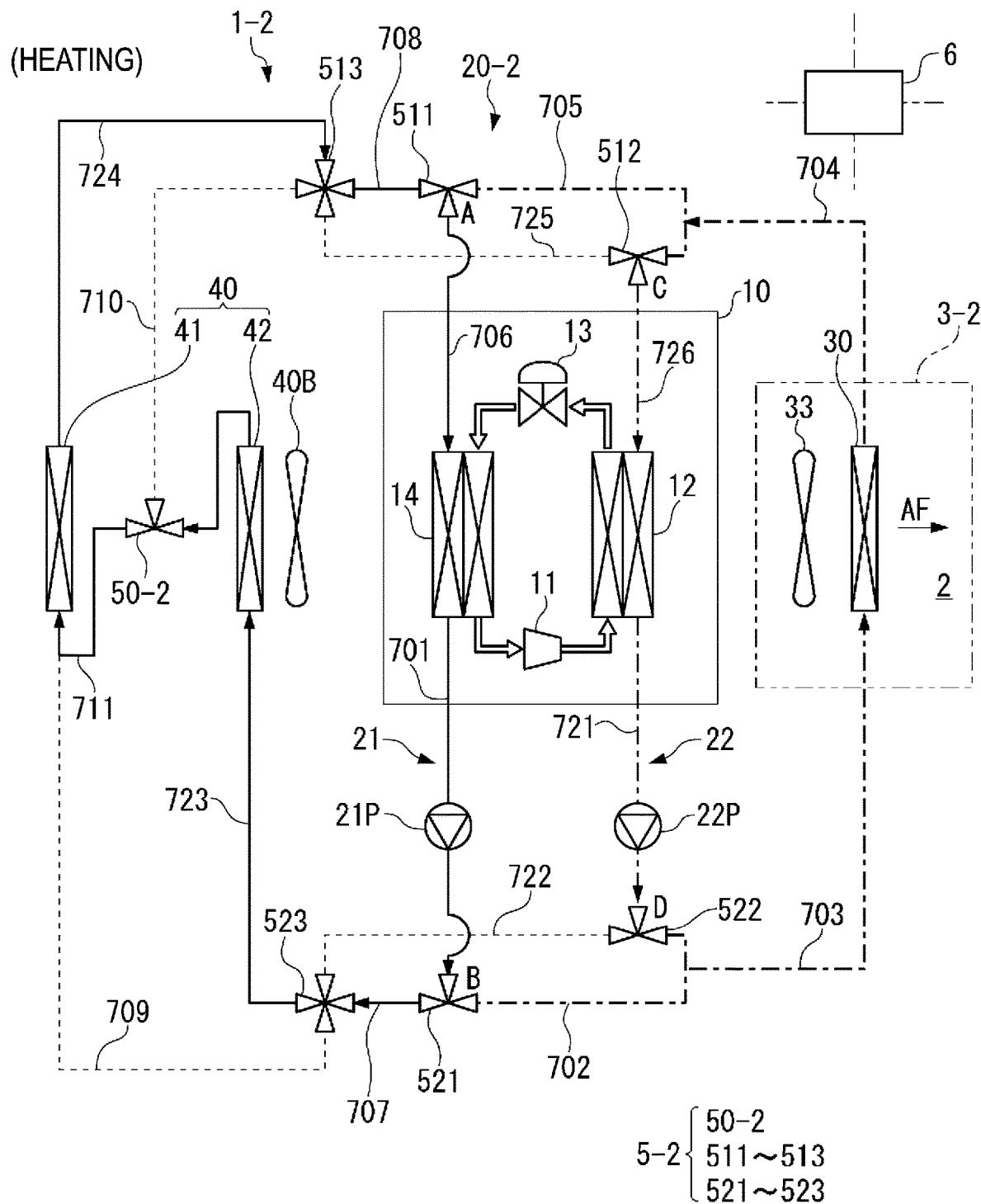
FIG. 6 is a diagram illustrating an example of respective paths of the low-temperature heat medium and the high-temperature heat medium in a heating mode of the vehicle air conditioning system illustrated in FIG. 5.

The first heat exchanger 41 and the second heat exchanger 42 are connected in series in the cooling mode illustrated in FIG. 5 and the heating mode illustrated in FIG. 6.

In the cooling mode (FIG. 5), the low-temperature heat medium is supplied to the vehicle interior heat exchanger 30, and the high-temperature heat medium is sequentially supplied to the second heat exchanger 42 and the first heat exchanger 41 connected in series.

In the heating mode (FIG. 6), the high-temperature heat medium is supplied to the vehicle interior heat exchanger 30, and the low-temperature heat medium is sequentially supplied to the second heat exchanger 42 and the first heat exchanger 41 connected in series.

The first heat exchanger 41 and the second heat exchanger 42 are arranged in series with respect to the flow of air sent from the air blower 40B.

Figure 7A:
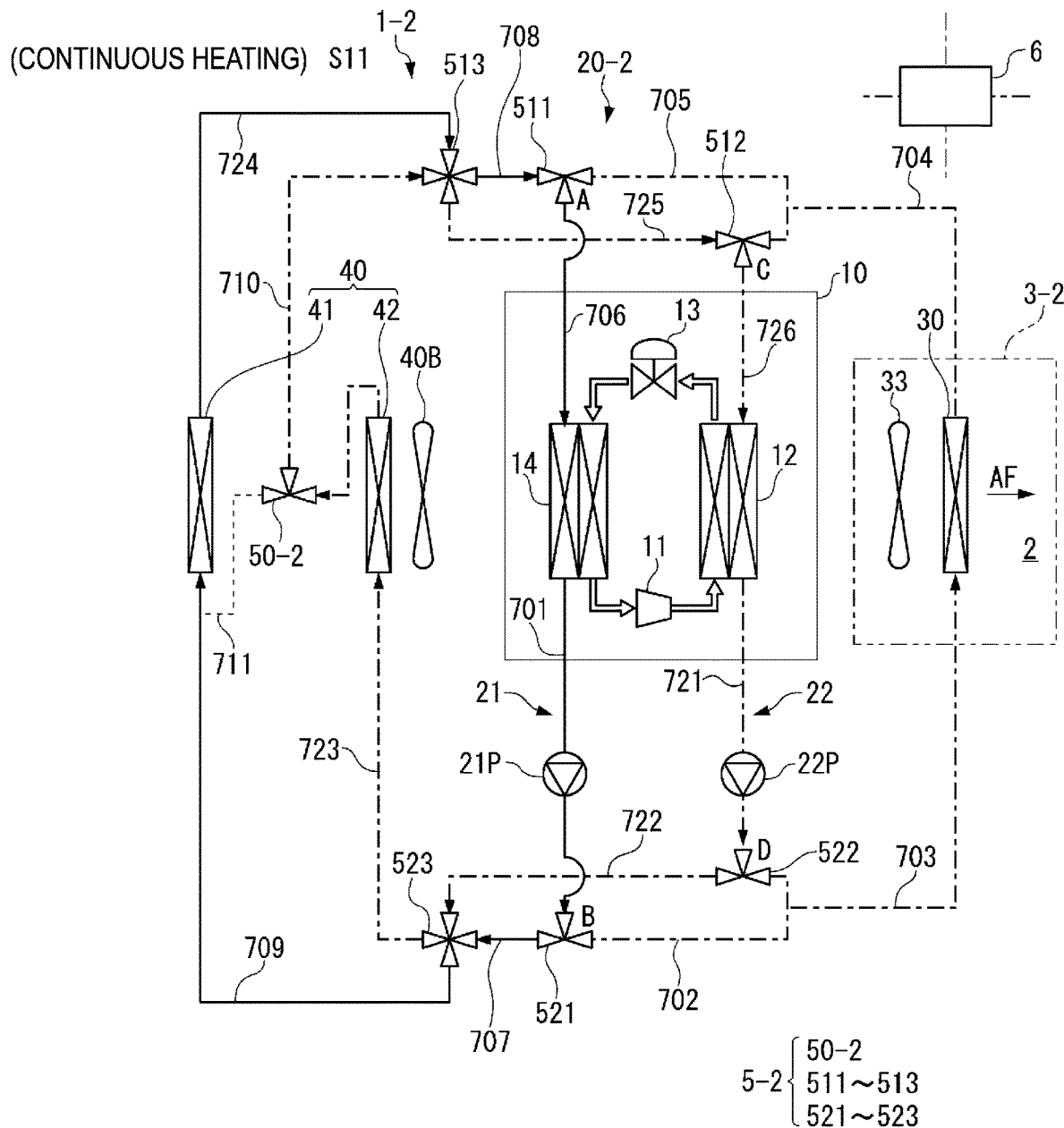
FIG. 7A is a diagram corresponding to a first step of a continuous heating mode of the vehicle air conditioning system illustrated in FIG. 5.
Figure 7B:
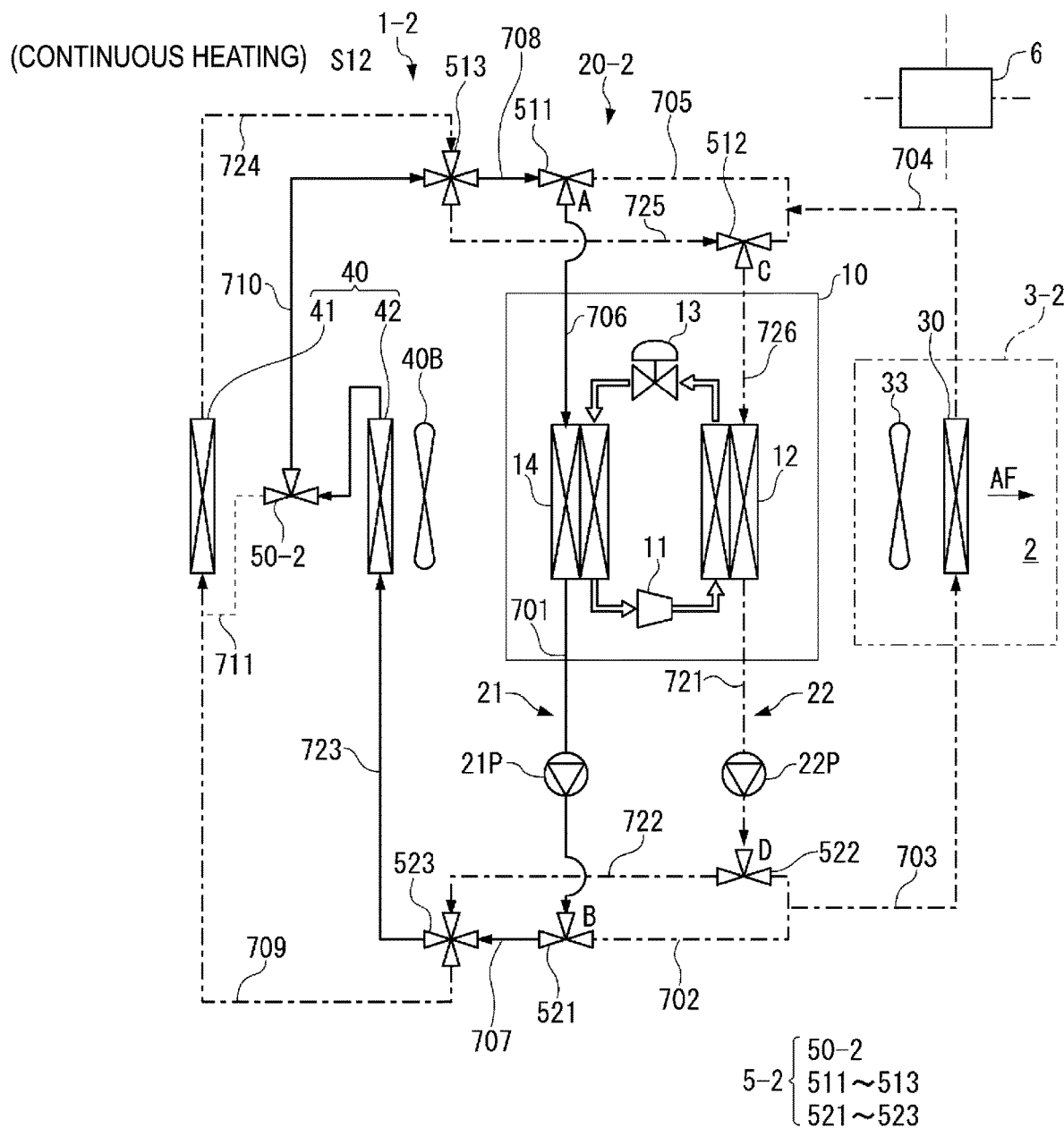
FIG. 7B is a diagram corresponding to a second step of the continuous heating mode following FIG. 7A.

The vehicle air conditioning system 1-2 has a continuous heating mode illustrated in FIGS. 7A and 7B in addition to the cooling mode and the heating mode. In addition, the vehicle air conditioning system 1-2 may have a freeze cleaning mode in which frost is formed on the heat exchanger 30 by supplying the low-temperature heat medium, and then the surface of the heat exchanger is cleaned by melting the frost by supplying the high-temperature heat medium.

Continuous Heating Mode

In the continuous heating mode, the heating operation is continuously performed without interruption by sequentially defrosting a plurality of the heat exchangers 41 and 42 by the supply of the high-temperature heat medium while continuing heat absorption from outside air to the low-temperature heat medium in one of the heat exchangers. This is also effective when the vehicle exterior heat exchanger 40 includes three or more heat exchangers.

In the continuous heating mode described above, the plurality of heat exchangers 41 and 42 are connected in parallel.

In the present embodiment, the defrosting of the first heat exchanger 41 and the defrosting of the second heat exchanger 42 are alternately and sequentially performed as in the examples illustrated in FIGS. 7A and 7B.

For example, as illustrated in FIG. 7A, the low-temperature heat medium is supplied to the first heat exchanger 41, the high-temperature heat medium is supplied to the second heat exchanger 42, and the high-temperature heat medium is supplied to the vehicle interior heat exchanger 30 (first heating step S11).

When the frost on a surface of the second heat exchanger 42 is melted and removed from the surface by supplying the high-temperature heat medium to the second heat exchanger 42, the open/close states of the valves 50-2, 522, and 523 are switched in accordance with a control command from the control device 6, and the processing proceeds to the second heating step S12.

In the subsequent second heating step S12, the low-temperature heat medium is supplied to the second heat exchanger 42, the high-temperature heat medium is supplied to the first heat exchanger 41, and the high-temperature heat medium is supplied to the vehicle interior heat exchanger 30. When the frost on a surface of the first heat exchanger 41 to which the high-temperature heat medium is supplied is melted and removed from the surface, the continuous heating mode can be switched to the heating mode (FIG. 6).

Contrary to the above, the defrosting by supplying the high-temperature heat medium to the second heat exchanger 42 may precede the defrosting by supplying the high-temperature heat medium to the first heat exchanger 41.

According to the vehicle air conditioning system 1-2 and the air conditioning method using the vehicle air conditioning system 1-2 of the second embodiment, the connection of the first heat exchanger 41 and the second heat exchanger 42 as the vehicle exterior heat exchanger 40 is switched to series connection or parallel connection by the switching unit 5-2 so as to set the respective paths of the high-temperature heat medium and the low-temperature heat medium, and thereby it is possible to implement various operation modes including the cooling and heating modes and the continuous heating mode with a simple structure and a simple control at low costs.

According to the vehicle air conditioning system 1, 1-2 described above, the connection between elements such as the vehicle interior heat exchanger 30, the vehicle exterior heat exchanger 40, the heat-absorbing heat exchanger 12, and the heat-dissipating heat exchanger 14 can be changed in accordance with the open/close states of the valves constituting the switching unit 5, 5-2, including series or parallel connection of the first and second heat exchangers 31, 32 on a vehicle interior side or the first and second heat exchangers 41, 42 on a vehicle exterior side. Accordingly, it is possible to provide a vehicle air conditioning system having operation modes responding to various needs.

Examples of combinations of the connection state of the first and second heat exchangers 31, 32 on the vehicle interior side and the connection state of the first and second heat exchangers 41, 42 on the vehicle exterior side (vehicle interior connection state and vehicle exterior connection state) include (series, series), (parallel, parallel), (series, parallel), and (parallel, series).

Besides the above-described embodiment, configurations explained in the above-described embodiment can be selected or omitted as desired or can be changed to other configurations as necessary.

When the first heat exchanger 31 and the second heat exchanger 32 are connected in parallel with respect to the flow of the heat medium or the first heat exchanger 41 and the second heat exchanger 42 are connected in parallel with respect to the flow of the heat medium at the time of cooling or heating, the temperature differential between the heat medium and air is smaller on a downwind side than on an upwind side, and thus the capacity is lower on the downwind side than on the upwind side. Then, the capacity is equalized by the joining of the respective heat media flowing out from the first and second heat exchangers. When the first and second heat exchangers are connected in series with respect to the flow of the heat medium as in each of the embodiments described above, the same or higher capacity can be expected as compared to the case of parallel connection or the case of operation by supplying the heat medium to only one of the first and second heat exchangers, which is preferable.

The above description is based on the assumption that the first and second heat exchangers are arranged in series with respect to the flow of air, where the first and second heat exchangers 31, 32 on the vehicle interior side that are arranged in series with respect to the flow of air especially for the dehumidification heating operation is used as a typical example, but the first and second heat exchangers may be arranged in parallel with respect to the flow of air.

At the time of cooling or heating, it is not excluded that the first heat exchanger 31 and the second heat exchanger 32 are connected in parallel with respect to the flow of the heat medium, or that only one of the first and second heat exchangers 31, 32 is connected to the heat medium circuit for operation. Similarly, at the time of cooling or heating, it is not excluded that the first heat exchanger 41 and the second heat exchanger 42 are connected in parallel with respect to the flow of the heat medium, or that only one of the first and second heat exchangers 41, 42 is connected to the heat medium circuit for operation.

Supplementary Notes

The vehicle air conditioning system and the vehicle air-conditioning method described above are understood as follows.

[1] A vehicle air conditioning system 1/1-2 includes: a refrigerant circuit configured to circulate a refrigerant through a compressor 11, a heat-absorbing heat exchanger 12, a decompression unit (13), and a heat-dissipating heat exchanger 14 in accordance with a refrigeration cycle; a heat medium circuit 20/20-2 including a high-temperature heat medium circuit 22 configured to circulate a high-temperature heat medium that absorbs heat from the refrigerant in the heat-absorbing heat exchanger 12 and a low-temperature heat medium circuit 21 configured to circulate a low-temperature heat medium that dissipates heat to the refrigerant in the heat-dissipating heat exchanger 14; a vehicle interior heat exchanger 30 configured to exchange heat between air and at least one of the high-temperature heat medium and the low-temperature heat medium; a vehicle exterior heat exchanger 40 configured to exchange heat between air and at least one of the high-temperature heat medium and the low-temperature heat medium; and a switching unit 5/5-2 configured to switch flows of the high-temperature heat medium and the low-temperature heat medium in accordance with an operation mode of the vehicle air conditioning system 1/1-2.

In accordance with an operation mode, the heat medium circuit supplies the high-temperature heat medium to at least one of the vehicle interior heat exchanger 30 and the vehicle exterior heat exchanger 40, and supplies the low-temperature heat medium to at least one of the vehicle interior heat exchanger and the vehicle exterior heat exchanger 40.

At least one of the vehicle interior heat exchanger 30 and the vehicle exterior heat exchanger 40 includes a first heat exchanger 31 and a second heat exchanger 32 (or 41 and 42) which can be connected in series or in parallel in the heat medium circuit 20/20-2.

The switching unit 5/5-2 switches the flow of the high-temperature heat medium on an upstream side and a downstream side of the heat-absorbing heat exchanger 12, switches the flow of the low-temperature heat medium on an upstream side and a downstream side of the heat-dissipating heat exchanger 14, and switches the connection of the first heat exchanger 31 and the second heat exchanger 32 (or 41 and 42) between series connection and parallel connection.

[2] The vehicle interior heat exchanger 30 includes a first interior heat exchanger (31) as the first heat exchanger and a second interior heat exchanger (32) as the second heat exchanger.

The operation mode includes at least one of a cooling mode in which the low-temperature heat medium is sequentially supplied to the first interior heat exchanger (31) and the second interior heat exchanger (32) in a state where the first interior heat exchanger (31) and the second interior heat exchanger (32) are connected in series, and the high-temperature heat medium is supplied to the vehicle exterior heat exchanger (40), and a heating mode in which the high-temperature heat medium is sequentially supplied to the first interior heat exchanger (31) and the second interior heat exchanger (32) in a state where the first interior heat exchanger (31) and the second interior heat exchanger (32)

are connected in series, and the low-temperature heat medium is supplied to the vehicle exterior heat exchanger 40.

- [3] The vehicle air conditioning system 1 includes an air blower (33), an air guide path (34) through which air sent by the air blower (33) flows, the first interior heat exchanger (31) located in the air guide path (34), and the second interior heat exchanger (32) which is located in the air guide path (34) and into which at least part of air having passed through the first interior heat exchanger (31) is introduced.
- [4] The operation mode includes a dehumidification heating mode in which the low-temperature heat medium is supplied to the first interior heat exchanger (31) and the high-temperature heat medium is supplied to the second interior heat exchanger (32) in a state where the first interior heat exchanger (31) and the second interior heat exchanger (32) are connected in parallel.
- [5] The operation mode includes a freeze cleaning mode of sequentially performing a first step S01 of supplying the low-temperature heat medium to one of the first interior heat exchanger (31) and the second interior heat exchanger (32) to form frost on the one of the first interior heat exchanger (31) and the second interior heat exchanger (32), a second step S02 of supplying the low-temperature heat medium to another of the first interior heat exchanger (31) and the second interior heat exchanger (32) to form frost on the other while supplying the high-temperature heat medium to the one of the first interior heat exchanger (31) and the second interior heat exchanger (32), and a third step S03 of supplying the high-temperature heat medium to the other of the first interior heat exchanger (31) and the second interior heat exchanger (32), and the second step S02 and the third step S03 are performed in a state where the first interior heat exchanger (31) and the second interior heat exchanger (32) are connected in parallel.
- [6] The vehicle exterior heat exchanger 40 includes a first exterior heat exchanger (41) as the first heat exchanger and a second exterior heat exchanger (42) as the second heat exchanger.

The operation mode includes at least one of a heating mode in which the low-temperature heat medium is sequentially supplied to the first exterior heat exchanger (41) and the second exterior heat exchanger (42) in a state where the first exterior heat exchanger (41) and the second exterior heat exchanger (42) are connected in series, and the high-temperature heat medium is supplied to the vehicle interior heat exchanger 30, and a cooling mode in which the high-temperature heat medium is sequentially supplied to the first exterior heat exchanger (41) and the second exterior heat exchanger (42) in a state where the first exterior heat exchanger (41) and the second exterior heat exchanger (42) are connected in series, and the low-temperature heat medium is supplied to the vehicle interior heat exchanger 30.

- [7] The operation mode includes a continuous heating mode of sequentially supplying, in a state where the first exterior heat exchanger and the second exterior heat exchanger are connected in parallel, a first heating step S11 of supplying the low-temperature heat medium to the first exterior heat exchanger (41), supplying the high-temperature heat medium to the second exterior heat exchanger (42), and supplying the high-temperature heat medium to the vehicle interior heat exchanger 30, and a second heating step S12 of supplying the low-temperature heat medium to the second exterior heat exchanger (42), supplying the high-temperature heat medium to the first exterior heat exchanger (41), and supplying the high-temperature heat medium to the vehicle interior heat exchanger 30 in a state where the first exterior heat exchanger (41) and the second exterior heat exchanger (42) are connected in parallel.
- [8] The switching unit 5/5-2 includes a three-way valve (50/50-2) located between the first heat exchanger and the second heat exchanger.
- [9] The first heat exchanger (31) and the second heat exchanger (32) are arranged in series with respect to airflow.
- [10] A vehicle air conditioning method is a method using a vehicle air conditioning system 1/1-2 including a refrigerant circuit 10 configured to circulate a refrigerant in accordance with a refrigeration cycle, a heat medium circuit 20/20-2 including a high-temperature heat medium circuit 22 configured to circulate a high-temperature heat medium that absorbs heat from the refrigerant in a heat-absorbing heat exchanger 12 in the refrigerant circuit 10 and a low-temperature heat medium circuit 21 configured to circulate a low-temperature heat medium that dissipates heat to the refrigerant in a heat-dissipating heat exchanger 14 in the refrigerant circuit 10, a vehicle interior heat exchanger 30 configured to exchange heat between air and at least one of the high-temperature heat medium and the low-temperature heat medium, and a vehicle exterior heat exchanger 40 configured to exchange heat between air and at least one of the high-temperature heat medium and the low-temperature heat medium, at least one of the vehicle interior heat exchanger 30 and the vehicle exterior heat exchanger 40 including a first heat exchanger 31 and a second heat exchanger 32 (or 41 and 42) being connectable in series or in parallel in the heat medium circuit 20/20-2, the method including:

switching a flow of the high-temperature heat medium on an upstream side and a downstream side of the heat-absorbing heat exchanger 12 in accordance with an operation mode of the vehicle air conditioning system 1/1-2;

switching a flow of the low-temperature heat medium on an upstream side and a downstream side of the heat-dissipating heat exchanger 14 in accordance with the operation mode; and switching a connection of the first heat exchanger 31 and the second heat exchanger 32 (or 41, 42) between series connection and parallel connection in accordance with the operation mode.

REFERENCE SIGNS LIST

1 Vehicle air conditioning system
2 Vehicle cabin
3, 3-2 HVAC unit
5-2 Switching unit
6 Control device
10 Refrigerant circuit
11 Compressor
12 Heat-absorbing heat exchanger
13 Expansion valve (decompression unit)
14 Heat-dissipating heat exchanger
20-2 Heat medium circuit
21 Low-temperature heat medium circuit
21P Pump
22 High-temperature heat medium circuit 22P Pump
30 Vehicle interior heat exchanger
31 First heat exchanger (first interior heat exchanger)
32 Second heat exchanger (second interior heat exchanger)
33 Blower (air blower)
34 Duct (air guide path)
35 Damper
40 Vehicle exterior heat exchanger
40A Exterior heat exchanger
40B Air blower
41 First heat exchanger (first exterior heat exchanger)
42 Second heat exchanger (second exterior heat exchanger)
50 Intermediate valve
511 to 513 Upstream valve
521 to 523 Downstream valve
701 to 711, 721 to 726 Pipe
S01 First step of freeze cleaning mode
S02 Second step of freeze cleaning mode
S03 Third step of freeze cleaning mode
S11 First heating step of continuous heating mode
S12 Second heating step of continuous heating mode

The invention claimed is:

1. A vehicle air conditioning system comprising:
a refrigerant circuit configured to circulate a refrigerant through a compressor, a heat-absorbing heat exchanger, an expansion valve, and a heat-dissipating heat exchanger in accordance with a refrigeration cycle;
a heat medium circuit including a high-temperature heat medium circuit configured to circulate a high-temperature heat medium that absorbs heat from the refrigerant in the heat-absorbing heat exchanger and a low-temperature heat medium circuit configured to circulate a low-temperature heat medium that dissipates heat to the refrigerant in the heat-dissipating heat exchanger;
a vehicle interior heat exchanger configured to exchange heat between air and at least one of the high-temperature heat medium and the low-temperature heat medium;
a vehicle exterior heat exchanger configured to exchange heat between air and at least one of the high-temperature heat medium and the low-temperature heat medium; and
switching valves configured to switch respective flows of the high-temperature heat medium and the low-temperature heat medium in accordance with an operation mode of the vehicle air conditioning system, wherein
the heat medium circuit supplies the high-temperature heat medium to at least one of the vehicle interior heat exchanger and the vehicle exterior heat exchanger and supplies the low-temperature heat medium to at least one of the vehicle interior heat exchanger and the vehicle exterior heat exchanger, in accordance with the operation mode,
at least one of the vehicle interior heat exchanger and the vehicle exterior heat exchanger includes a first heat exchanger and a second heat exchanger, the first heat exchanger and the second heat exchanger being connectable in series or in parallel in the heat medium circuit,
the switching valves switch a flow of the high-temperature heat medium on an upstream side and a downstream side of the heat-absorbing heat exchanger, switches a flow of the low-temperature heat medium on an upstream side and a downstream side of the heat-dissipating heat exchanger, and switches a connection of the first heat exchanger and the second heat exchanger between series connection and parallel connection,
the vehicle exterior heat exchanger includes:
a first exterior heat exchanger as the first heat exchanger; and
a second exterior heat exchanger as the second heat exchanger,
the operation mode includes at least one of:
a heating mode in which the low-temperature heat medium is sequentially supplied to the first exterior heat exchanger and the second exterior heat exchanger in a state where the first exterior heat exchanger and the second exterior heat exchanger are connected in series, and the high-temperature heat medium is supplied to the vehicle interior heat exchanger, and
a cooling mode in which the high-temperature heat medium is sequentially supplied to the first exterior heat exchanger and the second exterior heat exchanger in a state where the first exterior heat exchanger and the second exterior heat exchanger are connected in series, and the low-temperature heat medium is supplied to the vehicle interior heat exchanger, and
the operation mode includes:
a continuous heating mode of sequentially performing, in a state where the first exterior heat exchanger and the second exterior heat exchanger are connected in parallel,
a first heating step of supplying the low-temperature heat medium to the first exterior heat exchanger, supplying the high-temperature heat medium to the second exterior heat exchanger, and supplying the high-temperature heat medium to the vehicle interior heat exchanger, and
a second heating step of supplying the low-temperature heat medium to the second exterior heat exchanger, supplying the high-temperature heat medium to the first exterior heat exchanger, and supplying the high-temperature heat medium to the vehicle interior heat exchanger.

2. The vehicle air conditioning system according to claim 1, wherein
the vehicle interior heat exchanger includes
a first interior heat exchanger as the first heat exchanger, and
a second interior heat exchanger as the second heat exchanger, and
the operation mode includes at least one of
a cooling mode in which the low-temperature heat medium is sequentially supplied to the first interior heat exchanger and the second interior heat exchanger in a state where the first interior heat exchanger and the second interior heat exchanger are connected in series, and the high-temperature heat medium is supplied to the vehicle exterior heat exchanger, and
a heating mode in which the high-temperature heat medium is sequentially supplied to the first interior heat exchanger and the second interior heat exchanger in a state where the first interior heat exchanger and the second interior heat exchanger are connected in series, and the low-temperature heat medium is supplied to the vehicle exterior heat exchanger.

3. The vehicle air conditioning system according to claim 2, further comprising:
- an air blower;
- an air guide path through which air sent by the air blower flows;
- the first interior heat exchanger located in the air guide path; and
- the second interior heat exchanger which is located in the air guide path and into which at least part of air having passed through the first interior heat exchanger is introduced.

4. The vehicle air conditioning system according to claim 3, wherein the operation mode includes a dehumidification heating mode in which the low-temperature heat medium is supplied to the first interior heat exchanger and the high-temperature heat medium is supplied to the second interior heat exchanger in a state where the first interior heat exchanger and the second interior heat exchanger are connected in parallel.

5. The vehicle air conditioning system according to claim 2, wherein the operation mode includes
- a freeze cleaning mode of sequentially performing
- a first step of supplying the low-temperature heat medium to one of the first interior heat exchanger and the second interior heat exchanger such that frost is formed on the one of the first interior heat exchanger and the second interior heat exchanger,
- a second step of supplying the low-temperature heat medium to another of the first interior heat exchanger and the second interior heat exchanger such that frost is formed on the other while supplying the high-temperature heat medium to the one of the first interior heat exchanger and the second interior heat exchanger, and
- a third step of supplying the high-temperature heat medium to the other of the first interior heat exchanger and the second interior heat exchanger, and
- the second step and the third step are performed in a state where the first interior heat exchanger and the second interior heat exchanger are connected in parallel.

6. The vehicle air conditioning system according to claim 1, wherein the switching valves include a three-way valve located between the first heat exchanger and the second heat exchanger.

7. The vehicle air conditioning system according to claim 1, wherein the first heat exchanger and the second heat exchanger are arranged in series with respect to airflow.

8. A vehicle air conditioning method using a vehicle air conditioning system including a refrigerant circuit configured to circulate a refrigerant in accordance with a refrigeration cycle, a heat medium circuit including a high-temperature heat medium circuit configured to circulate a high-temperature heat medium that absorbs heat from the refrigerant in a heat-absorbing heat exchanger in the refrigerant circuit and a low-temperature heat medium circuit configured to circulate a low-temperature heat medium that dissipates heat to the refrigerant in a heat-dissipating heat exchanger in the refrigerant circuit, a vehicle interior heat exchanger configured to exchange heat between air and at least one of the high-temperature heat medium and the low-temperature heat medium, and a vehicle exterior heat exchanger configured to exchange heat between air and at least one of the high-temperature heat medium and the low-temperature heat medium, at least one of the vehicle interior heat exchanger and the vehicle exterior heat exchanger including a first heat exchanger and a second heat exchanger being connectable in series or in parallel in the heat medium circuit, the method comprising:
- switching a flow of the high-temperature heat medium on an upstream side and a downstream side of the heat-absorbing heat exchanger, in accordance with an operation mode of the vehicle air conditioning system;
- switching a flow of the low-temperature heat medium on an upstream side and a downstream side of the heat-dissipating heat exchanger in accordance with the operation mode; and
- switching a connection of the first heat exchanger and the second heat exchanger between series connection and parallel connection in accordance with the operation mode, wherein the vehicle exterior heat exchanger includes:
- a first exterior heat exchanger as the first heat exchanger; and
- a second exterior heat exchanger as the second heat exchanger, the operation mode includes at least one of:
- a heating mode in which the low-temperature heat medium is sequentially supplied to the first exterior heat exchanger and the second exterior heat exchanger in a state where the first exterior heat exchanger and the second exterior heat exchanger are connected in series, and the high-temperature heat medium is supplied to the vehicle interior heat exchanger, and
- a cooling mode in which the high-temperature heat medium is sequentially supplied to the first exterior heat exchanger and the second exterior heat exchanger in a state where the first exterior heat exchanger and the second exterior heat exchanger are connected in series, and the low-temperature heat medium is supplied to the vehicle interior heat exchanger, and the operation mode includes:
- a continuous heating mode of sequentially performing, in a state where the first exterior heat exchanger and the second exterior heat exchanger are connected in parallel,
- a first heating step of supplying the low-temperature heat medium to the first exterior heat exchanger, supplying the high-temperature heat medium to the second exterior heat exchanger, and supplying the high-temperature heat medium to the vehicle interior heat exchanger, and
- a second heating step of supplying the low-temperature heat medium to the second exterior heat exchanger, supplying the high-temperature heat medium to the first exterior heat exchanger, and supplying the high-temperature heat medium to the vehicle interior heat exchanger.

* * * * *